United States Patent Office 3,136,798
Patented June 9, 1964

3,136,798
CHROMIUM PENTACARBONYL ISOCYANIDE
HYDRIDE ETHERATES
Raymond E. Maginn, Detroit, Mich., assignor to Ethyl
Corporation, New York, N.Y., a corporation of
Virginia
No Drawing. Filed Mar. 29, 1962, Ser. No. 183,396
10 Claims. (Cl. 260—438)

This invention relates to novel acidic organometallic compounds and to a process for their formation. More specifically, this invention relates to novel organometallic compounds containing an ether molecule and two atoms of chromium, each chromium atom being bonded to five carbonyl groups and to a hydrogen isocyanide radical.

An object of this invention is to provide organometallic compounds containing an ether molecule and two chromium atoms, wherein each chromium atom is bonded to five carbonyl groups. A further object is to provide derivatives of hydrogen isocyanide. That compound is not known to exist. Another object is to provide new dibasic acids which are soluble in water and in organic solvents. Still another object is to provide compounds having utility as metal plating agents. A further object is to provide a new process for the preparation of the novel compounds.

The objects of this invention are accomplished by providing compounds having the formula $$[\text{H—NC—Cr(CO)}_5]_2 \cdot \text{Y}$$

(I)

wherein Y is an acyclic bidentate ether. These compounds are prepared by reacting a salt having the formula $$\text{M(Y)}_2\text{Cr(CO)}_5\text{CN}$$

(II)

wherein M is an alkali metal cation and Y is a bidentate non-cyclic ether with a hydrohalide, HX, wherein X is a halogen. The cyano chromium pentacarbonyl salts illustrated by Formula II contribute the NCCr(CO)$_5$ moiety in the new compounds. They also contribute the etherate molecule. These salts are described in my co-pending application, Serial No. 102,123, filed April 11, 1961, now U.S. Patent No. 3,095,436. They are composed of a cyano chromium pentacarbonyl anion, Cr(CO)$_5$CN⁻, and an etherated-alkali metal cation. The alkali metal cation may be either lithium, sodium, potassium, cesium or rubidium. Preferably, it is sodium or potassium, most preferably sodium. The ether molecule coordinated with the alkali metal is a bidentate ether such as dimethoxyethane, diethoxypropane, dipropoxyethane and the like. Illustrative examples of these starting materials are sodium bis(1,2-dimethoxyethane) cyano chromium pentacarbonyl, Na(DME)$_2$Cr(CO)$_5$CN; sodium bis(1,3-diethoxypropane) cyanochromium pentacarbonyl, Na(DEP)$_2$Cr(CO)$_5$CN; and sodium bis(1,2-dipropoxyethane) cyano chromium pentacarbonyl, Na(DPE)$_2$Cr(CO)$_5$CN The novel compounds of this invention are prepared by reacting the cyanochromium pentacarbonyl salts with a hydrohalide. Applicable hydrohalides include hydrogen chloride, hydrogen bromide, and hydrogen iodide. Hydrogen derivatives of pseudo-halogens such as hydrogen cyanide can also be employed.

Although not bound by any theory, the process of this invention can be illustrated as follows:

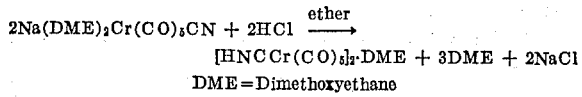

DME = Dimethoxyethane

The process can be carried out in the presence of a solvent. Typical solvents that can be employed are ethers and acetals. It is preferred that the solvents be deoxygenated prior to use. Organic solvents that are non-reactive toward the products and reactants and which readily dissolve the compounds of this invention, but do not dissolve the alkali metal salt by-product, are preferred.

The most preferred solvents are the non-cyclic ethers such as dibutylether, diethylether, diethyleneglycol dimethylether, dipropyleneglycol diethylether and the like. Other ether solvents that can be employed are the bidentate non-cyclic ethers such as dimethoxyethane, diethoxyethane, dipropoxyethane and the like. The most preferred solvent is diethylether.

Typical acetals which can be employed as solvents in this process are ethylal, methylal, dimethyl chloroacetal and the like.

Another class of solvents which can be employed are cyclic and acyclic aliphatic hydrocarbon ketones such as diethyl ketone and cyclopentanone. This type of solvent preferably should have a boiling point at atmospheric pressure within the range of from about 60 to about 200° C.

The process of this invention is effectively carried out at atmospheric pressure. However, higher and lower pressures can be employed if desired. Generally, the hydrohalide reactant furnishes a suitable inert atmosphere. However, the reaction mixture can be blanketed with an inert gas such as nitrogen, helium, argon, neon and the like. Nitrogen is preferred since it is economical.

The reaction temperature is not critical and the process may be carried out at a temperature in the range of —50° to 100° C. Higher or lower temperatures may be employed if desired. However, it is preferred that the temperature be high enough to afford a reasonable rate of reaction but not so high as to destroy the products or reactants. The preferred temperature is in the range of —15 to +35° C. The most preferred temperature range is from —5° to +20° C. Cooling the reaction mixture below room temperature can be accomplished by a number of expedients. External cooling means, obvious to those skilled in the art, can be employed if desired. Suitable cooling can also be effected by the evaporation of the solvent if the solvent, like diethylether, is sufficiently volatile at room temperature.

Generally, the reagents are contacted by bubbling or otherwise passing the hydrohalide into a solution of the cyanochromium pentacarbonyl salts. Other means of contacting the reagents, obvious to one skilled in the art, can be employed if desired. However, bubbling the hydrohalide through the solution is preferred since the bubbling action affords suitable agitation of the reaction mixture and assists in the evaporation of the solvent which cools the reaction mixture. The excess of the hydrogen halide gas affords a suitable inert atmosphere. The bubbling action usually affords a suitable rate of agitation. If desired, additional agitation means, for example rocking or stirring, can be employed.

The time required is not a true independent variable but is dependent upon the other process variables employed. Generally, when high temperatures and suitable agitation is effected, there will be a proportionate decrease in the reaction time. Similarly, if the inorganic salt, formed as a by-product in this reaction, is very insoluble in the solvent employed, the time required will be reduced. When the process of this invention is followed according to the above discussion and the following examples, reaction times in the order of five minutes to one hour usually yield satisfactory results. The preferred reaction time is in the range of 10 to 30 minutes. If desired, the extent of the reaction can be determined by measurement of the amount of insoluble alkali metal halide by-product formed in the reaction.

In general, the products of this invention are pale, i.e., colorless to orange crystalline solids. They can be readily separated from the reaction mixtures in which they are obtained by techniques familiar to those skilled in the art. Examples of such techniques are crystallization, sublimation and chromatography. Usually the insoluble by-product is removed by filtration and then the solvent is removed by distillation either at atmospheric pressure or in vacuo. It has been found that several additions of excess solvent during the course of the solvent removal step raises the yield of the desired compound.

To further illustrate the process of this invention and the novel products produced thereby, the following examples are presented in which all parts and percentages are by weight unless otherwise indicated.

*Example I.—Preparation of Bis(Chromium Pentacarbonyl Isocyanide Hydride)Dimethoxyethane*

Dry hydrogen chloride gas was bubbled for 15 minutes into a solution of 3.29 parts of sodium bis(dimethoxyethane) cyanochromium pentacarbonyl in 45 parts of diethylether. The color changed from green-yellow to red-orange. A precipitate of sodium chloride formed during the reaction. This precipitate was removed by filtration, washed with ether, and dried. A total of 4.6 parts of sodium chloride was isolated. The ether solvent was removed from the filtrate by distillation at reduced pressure. A brown-orange viscous residue resulted. The residue was extracted with petroleum ether and the petroleum ether solution was cooled with Dry Ice. Pale yellow solids were deposited from the solution. Several successive recrystallizations from petroleum ether yielded colorless crystals of bis(chromium pentacrabonyl isocyanide hydride) dimethoxyethane, M.P. 59.5–60.5° C. The compound was stable in air at room temperature for a period less than one hour. The crystals were soluble in water and the resulting solutions were acidic. The compound was also soluble in ether, benzene, petroleum ether, hexane and chloroform. The empirical formula

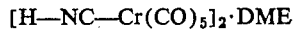

$$[H-NC-Cr(CO)_5]_2 \cdot DME$$

(DME=dimethoxyethane) is in agreement with the elemental analysis. Analysis; calculated for

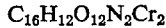

$$C_{16}H_{12}O_{12}N_2Cr_2$$

C, 36.4; H, 2.27; N, 5.30; Cr, 19.7. Found: C, 36.4; H, 2.43; N, 5.34; Cr, 19.7. The theoretical equivalent weight (264) was substantiated by titration of aqueous solutions of the compound with strong base. The $pK_a$ was 5.7. The molecular weight determined cryoscopically in benzene was 332 compared with the theoretical value of 528. This discrepancy may be due to partial or complete dissociation of the compound which may be in equilibrium with the monomeric form,

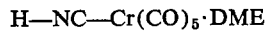

$$H-NC-Cr(CO)_5 \cdot DME$$

*Example II*

The procedure of Example I was followed using one part of sodium bis(dimethoxyethane) cyanochromium pentacarbonyl in 24 parts of ether. Dry hydrogen chloride gas was bubbled into this solution for 10 minutes. The product bis(chromium pentacarbonyl isocyanide hydride) dimethoxyethane was obtained in good yield.

*Example III*

The procedure of Example I was followed using two parts of sodium bis(dimethoxyethane) cyanochromium pentacarbonyl in 80 parts of ether. Dry hydrogen chloride gas was bubbled through this solution for 15 minutes. The identical product bis(chromium pentacarbonyl isocyanide hydride) dimethoxyethane was obtained in good yield.

*Example IV*

Five parts of potassium bis(dimethoxyethane) cyanochromium pentacarbonyl was dissolved in 40 parts of di- into this solution for 15 minutes. The mixture was filtered and the solvent removed as rapidly as possible by distillation at room temperature in vacuo. During the course of the solvent removal step, several 20-part portions of diethylether were added to the distillation vessel. The oil remaining after solvent removal was extracted with petroleum ether and the product bis(chromium pentacarbonyl isocyanide hydride) dimethoxyethane was obtained by crystallization upon cooling the petroleum ether solution with Dry Ice. The yield was 60 percent.

*Example V*

Following the procedure in Example I, bis(chromium pentacarbonyl isocyanide hydride) 1,3-diethoxy propane is prepared by reacting dry hydrogen bromide with sodium bis(1,3-diethoxypropane) cyanochromium pentacarbonyl in diethyleneglycol dimethylether.

Similar results are obtained when the solvent dibutylether is substituted for diethyleneglycol dimethylether and the reaction is carried out at −5° C., and when the solvent cyclopentanone is employed and the process is carried out at 75° C.

*Example VI*

Following the procedure of Example I, bis(chromium pentacarbonyl isocyanide hydride) 1,2-dipropoxyethane is prepared by reacting dry hydrogen iodide with potassium bis(1,2-dipropoxyethane) cyanochromium pentacarbonyl in dimethoxyethane. Similar results are obtained when ethylal is employed as the solvent.

The novel compounds of this invention have many utilities. One of the uses of these compounds is in metal plating. In this application, a vapor of the compound is decomposed to deposit a chromium-containing film on a substrate. The substrate is heated above the decomposition temperature of the compound in a closed chamber containing the vapor of one of the compounds of this invention. A variation of this utility is deposition of the chromium-containing film by immersion of the substrate into a vessel containing the compound and then heating the vessel above the decomposition temperature of the compound. The metal-containing films which are formed by the compounds can be employed as conductive surfaces or they can be used to produce a decorative effect on the substrate.

The novel compounds of this invention are useful as chemical intermediates. For example, the compounds of this invention can be reacted with inorganic and organic bases to form salts.

These compounds are useful as catalysts in those processes where an acidic catalyst is necessary. The novel compounds of this invention are also useful as biocides such as fungicides, herbicides and bactericides. The compounds also find use as additives in petroleum lubricants and fuels.

Having fully defined the novel compounds of this invention, their mode of preparation and their utilities, it is desired that the invention be limited only within the lawful scope of the appended claims.

I claim:

1. Compounds having the formula

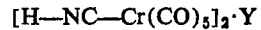

$$[H-NC-Cr(CO)_5]_2 \cdot Y$$

wherein Y is a bidentate acyclic ether.

2. Bis(chromium pentacarbonyl isocyanide hydride) dimethoxyethane.

3. Process for the formation of compounds having the formula

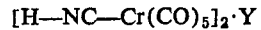

$$[H-NC-Cr(CO)_5]_2 \cdot Y$$

wherein Y is an acyclic bidentate ether, comprising reacting a compound having the formula

[H—NC—Cr(CO)₅]₂·Y wherein M is an alkali metal and Y is an acyclic bidentate ether, with a hydrohalide, HX, wherein X is a halogen, in the presence of a non-reactive organic solvent.

4. Process for the formation of bis(chromium pentacarbonyl isocyanide hydride) dimethoxyethane, said process comprising reacting a diethylether solution of sodium bis(dimethoxyethane) cyanochromium pentacarbonyl with hydrogen chloride.

5. Compounds having the formula

[H—NC—Cr(CO)₅]₂·Y wherein Y is a bidentate acyclic ether selected from the class consisting of dimethoxyethane, 1,2-dipropoxyethane, and 1,3-dipropoxyethane.

6. Process for the formation of a compound having the formula [H—NC—Cr(CO)₅]₂·Y, wherein Y is an acyclic bidentate ether selected from the class consisting of dimethoxyethane, 1,2-dipropoxyethane, and 1,3-dipropoxyethane, said process comprising reacting a compound having the formula A(Y)₂Cr(CO)₅CN wherein A is an alkali metal and Y is an acyclic bidentate ether selected from the class consisting of dimethoxyethane, 1,2-diethoxypropane, and 1,3-diethoxypropane, with a hydrohalide, HX, wherein X is a halogen, in the presence of a non-reactive organic solvent.

7. The process of claim 6 wherein Y is dimethoxyethane.

8. The process of claim 3 wherein said non-reactive organic solvent is diethylether.

9. The process of claim 3 being carried out at a temperature within the range of from 50 to 100° C.

10. Process for the formation of compounds having the formula [H—NC—Cr(CO)₅]₂·Y wherein Y is an acyclic bidentate ether, said process comprising reacting a compound having the formula M(Y)₂Cr(CO)₅CN, wherein M is an alkali metal and Y is an acyclic bidentate ether with hydrogen chloride in the presence of a non-reactive organic solvent.

References Cited in the file of this patent

Chemische Berichte, volume 89, No. 3, March 1956 (pages 616–619).

UNITED STATES PATENT OFFICE
CERTIFICATE OF CORRECTION

Patent No. 3,136,798　　　　　　　　　　June 9, 1964

Raymond E. Maginn

It is hereby certified that error appears in the above numbered patent requiring correction and that the said Letters Patent should read as corrected below.

Column 4, line 5, after "40 parts of di-" insert -- ethylether. Dry hydrogen chloride gas was bubbled --; column 5, line 3, the formula should appear as shown below instead of as in the patent:

$$M(Y)_2Cr(CO)_5CN$$

Signed and sealed this 27th day of October 1964.

(SEAL)
Attest:

ERNEST W. SWIDER
Attesting Officer

EDWARD J. BRENNER
Commissioner of Patents